(12) United States Patent
Acharya et al.

(10) Patent No.: US 12,475,601 B2
(45) Date of Patent: Nov. 18, 2025

(54) METHOD TO COMPUTE DRIFT IN IMAGE DATA BEFORE ML MODEL INFERENCE

(71) Applicant: Hitachi, Ltd., Tokyo (JP)

(72) Inventors: Joydeep Acharya, Milpitas, CA (US); Ravneet Kaur, San Jose, CA (US); Hidenori Omiya, Tokyo (JP); Yusaku Otsuka, Tokyo (JP); Takahiro Ohira, Tokyo (JP); Toshiki Shimizu, Tokyo (JP)

(73) Assignee: HITACHI, LTD., Tokyo (JP)

( * ) Notice: Subject to any disclaimer, the term of this patent is extended or adjusted under 35 U.S.C. 154(b) by 386 days.

(21) Appl. No.: 18/166,394

(22) Filed: Feb. 8, 2023

(65) Prior Publication Data

US 2024/0265582 A1  Aug. 8, 2024

(51) Int. Cl.
*G06T 7/00* (2017.01)
*G06T 7/11* (2017.01)

(52) U.S. Cl.
CPC . *G06T 7/97* (2017.01); *G06T 7/11* (2017.01)

(58) Field of Classification Search
CPC ......... G06T 7/0002; G06T 7/11; G06T 7/174; G06T 7/97; G06T 2207/10016; G06T 2207/20081; G06T 2207/30168
See application file for complete search history.

(56) References Cited

U.S. PATENT DOCUMENTS

| | | | | |
|---|---|---|---|---|
| 12,204,426 B2 * | 1/2025 | Sasson | | G06N 3/08 |
| 2016/0071027 A1 * | 3/2016 | Brand | | H04L 45/08 |
| | | | | 706/12 |
| 2016/0371601 A1 * | 12/2016 | Grove | | G06N 20/00 |
| 2019/0279102 A1 * | 9/2019 | Cataltepe | | G06V 10/80 |
| 2020/0012900 A1 * | 1/2020 | Walters | | G06F 16/283 |
| 2021/0097052 A1 * | 4/2021 | Hans | | G06F 16/9027 |
| 2021/0142198 A1 * | 5/2021 | Maturana | | G06N 7/01 |
| 2022/0024032 A1 * | 1/2022 | Singh | | B25J 9/1653 |
| 2022/0156578 A1 * | 5/2022 | Allahdadian | | G06F 17/18 |
| 2022/0188410 A1 * | 6/2022 | Allahdadian | | G06F 21/55 |
| 2022/0188707 A1 * | 6/2022 | Kingetsu | | G06F 18/22 |
| 2022/0215289 A1 * | 7/2022 | Mopur | | G06N 3/045 |
| 2022/0383038 A1 * | 12/2022 | Hines | | G06N 3/045 |
| 2023/0013470 A1 * | 1/2023 | Tabet | | G06F 18/217 |

(Continued)

OTHER PUBLICATIONS

Castellani et al. "Task-sensitive concept drift detector with constraint embedding." 2021 IEEE Symposium Series on Computational Intelligence (SSCI). IEEE, 2021. (Year: 2021).*
Escovedo et al. "DetectA: abrupt concept drift detection in non-stationary environments." Applied Soft Computing 62 (2018): 119-133. (Year: 2018).*
Lu et al. "Learning under concept drift: A review." IEEE transactions on knowledge and data engineering 31.12 (2018): 2346-2363. (Year: 2018).*

(Continued)

*Primary Examiner* — Katrina R Fujita
(74) *Attorney, Agent, or Firm* — PROCOPIO, CORY, HARGREAVES & SAVITCH LLP

(57) ABSTRACT

A method for computing and detecting image data drift. The method may include retrieving first segment information of a plurality of segments from a drift database; receiving a number of images from a sensor; partitioning each of the received images into segments of a predetermined number; generating second segment information; computing drift in values between the first segment information and the second segment information; and detecting drift based on the computed drift in values by combining the computed drift in segments to generate overall drift, and comparing the overall drift against a drift threshold.

20 Claims, 17 Drawing Sheets

(56) References Cited

U.S. PATENT DOCUMENTS

| | | | | |
|---|---|---|---|---|
| 2023/0069347 A1* | 3/2023 | Backhus | ............... | G06N 5/04 |
| 2023/0139718 A1* | 5/2023 | Valipour | ............... | G06N 3/006 |
| | | | | 706/12 |
| 2023/0144585 A1* | 5/2023 | Asthana | ............. | G06F 9/44536 |
| | | | | 706/12 |
| 2023/0144809 A1* | 5/2023 | Tajima | ................... | G06N 3/08 |
| | | | | 706/12 |
| 2023/0177118 A1* | 6/2023 | Ba | ......................... | G06F 18/27 |
| | | | | 706/15 |
| 2023/0401287 A1* | 12/2023 | Ni | ......................... | G06N 20/20 |
| 2024/0005199 A1* | 1/2024 | Butvinik | ............... | G06Q 40/02 |
| 2024/0028944 A1* | 1/2024 | Gottin | ................... | G06N 20/00 |
| 2024/0037384 A1* | 2/2024 | Lore | ..................... | G06N 3/084 |
| 2024/0037457 A1* | 2/2024 | Bhattacharjee | ........ | G06N 20/00 |
| 2024/0134937 A1* | 4/2024 | Ni | ........................ | G06F 18/217 |

OTHER PUBLICATIONS

Suprem et al. "Odin: Automated drift detection and recovery in video analytics." arXiv preprint arXiv:2009.05440 (2020). (Year: 2020).*

Mansukhani, Subir. "Data Drift Detection for Image Classifiers". Data Science. https://www.dominodatalab.com/blog/data-drift-detection-for-image-classifiers. Retrieved: Feb. 7, 2023. English Language. 12 pages.

Hanumaiah, Vinay. "Bring your own container to project model accuracy drift with Amazon SageMaker Model Monitor". AWS Machine Learning Blog. https://aws.amazon.com/blogs/machine-learning/bring-your-own-container-to-project-model-accuracy-drift-with-amazon-sagemaker-model-monitor/. Retrieved: Feb. 7, 2023. English Language. 11 pages.

\* cited by examiner

FIG. 6A  (a) N = 4 Uniform Grid

FIG. 6B  (b) N = 2 Application Specific Grid

| Parameter | Value | Description |
|---|---|---|
| N | 9 | Number of Segments |
| K | 30 | Feature Vector Length |
| T | 50 | Time Samples |
| Th | 0.8 | Threshold |
| $D_{th}$ | 0.8 | Threshold |
| Th3 | 0.8 | Threshold |

FIG. 15

| Segment | Trajectory points | CURRENT_DRIFT_DURATION | CURRENT_NODRIFT_DURATION | Adjacent Segments Sin | Mean ($\mu_n$) | Covariance ($\Sigma_n$) | Segment Importance Parameter | DRIFT_FLAG$_n$,* vector for t=[0,t] |
|---|---|---|---|---|---|---|---|---|
| A1 | {(0,0),(0,1), (1,1),(1,0)} | 0 | 5 | S1 = {A2, A4} | [0.77, 3.83,..., 0.91] | [0.12,..., 0.88 ..., 0.8] | $h_n$={0.11 for a ="Defect" 0.8 for a ="Cycle Time"} | [NO DRIFT, ..."SHORT TERM"] |
| A2 | {(0,1),(0,2), (1,2),(1,1)} | 0 | 0 | S2 = {A1, A3, A5} | ... | ... | ... | ... |
| | | | | | | | | |
| | | | | | | | | |
| | | | | | | | | |

FIG. 16

METHOD TO COMPUTE DRIFT IN IMAGE DATA BEFORE ML MODEL INFERENCE

BACKGROUND

Field

The present disclosure is generally directed to a method and a system for computing and detecting image data drift.

Related Art

When deploying machine learning models into production, a primary concern is the relevance of the model over time. Some questions to consider would be whether the model continues to capture new incoming data patterns and performs as well during the model training phase.

Data drift occurs when the data used during production/inference has different characteristics from data used during model training/learning. Data drift is generally caused by the occurrence of unexpected events, which can be temporary or permanent in nature. Data drift has been well-studied in the structured data area. However, data drift in association with unstructured data such as image remains a challenging task. In images, these drifts occur due to temporary occlusions, changes in environmental conditions, or accidental camera shifts resulting in image data drifts which affect the accuracy of the image analytics-based solutions.

In industrial settings, camera data is used to develop machine learning (ML)/artificial intelligence (AI) applications that are tied to improving industrial key performance indicators (KPIs). For example, camera data analysis can detect quality and maintenance issues and track production flow in factories. For camera data, drift can be categorized into three types: source data drift, camera data drift, and concept drift. Source data drift occurs when the model developed for one production line is deployed in a new/different production line where the data seems different from the data used for model training. Camera data drift is drift which is caused by the camera shifts in the factory caused by accidental camera bump by a worker or vibrations in the shop floor which can result in change in the view of the camera. Also, in factories, there is a potential for dust or oil collection on the camera lens which can blur a region/entire image. Concept drift can occur when the inference result become inaccurate as a result of data drift, i.e., the inference result affected by data drift collected over a short duration of time may provide inaccurate result, which may reflect the integrity of the ML model (i.e., whether ML model has provided accurate result or not).

Two concepts are of utmost interest, namely, concept drift that arises out of data drift and quick detection. However, these two requirements may be at odds with each other. For example, if the ML/AI application is to detect defects in a part being manufactured in a factory, and data drift has occurred in a window of time in which the camera performs monitoring of parts, a defect may not occur in the parts during that short-time window. Of course, it is also possible that it starts flagging non-defective parts as defective, but that alone is not a necessary and sufficient condition for determining data drift. Hence, the focus is not on concept drift directly, but to try and estimate its impact based on data drift alone, by considering the two-dimensional feature of the image data set.

In the related art, drift detection from non-image data such as text or documents is performed. As text and documents are much more structured when compared to images, draft detection for text and documents can be achieved far easier than images.

In the related art, a method for drift detection in relation to images is performed. The method assumes that a ML model is trained on site with readily available training data and then, as new data comes in, their characteristics are compared to those of the training data. However, training data may not be readily available at all instances, which could interfere with the training process.

SUMMARY

Aspects of the present disclosure involve an innovative method for computing and detecting image data drift. The method may include retrieving first segment information of a plurality of segments from a drift database; receiving a number of images from a sensor; partitioning each of the received images into segments of a predetermined number; generating second segment information; computing drift in values between the first segment information and the second segment information; and detecting drift based on the computed drift in values by combining the computed drift in segments to generate overall drift, and comparing the overall drift against a drift threshold.

Aspects of the present disclosure involve an innovative non-transitory computer readable medium, storing instructions for computing and detecting image data drift. The instructions may include retrieving first segment information of a plurality of segments from a drift database; receiving a number of images from a sensor; partitioning each of the received images into segments of a predetermined number; generating second segment information; computing drift in values between the first segment information and the second segment information; and detecting drift based on the computed drift in values by combining the computed drift in segments to generate overall drift, and comparing the overall drift against a drift threshold.

Aspects of the present disclosure involve an innovative server system for computing and detecting image data drift. The server system may include retrieving first segment information of a plurality of segments from a drift database; receiving a number of images from a sensor; partitioning each of the received images into segments of a predetermined number; generating second segment information; computing drift in values between the first segment information and the second segment information; and detecting drift based on the computed drift in values by combining the computed drift in segments to generate overall drift, and comparing the overall drift against a drift threshold.

Aspects of the present disclosure involve an innovative system for computing and detecting image data drift. The system may include means for retrieving first segment information of a plurality of segments from a drift database; means for receiving a number of images from a sensor; partitioning each of the received images into segments of a predetermined number; means for generating second segment information; means for computing drift in values between the first segment information and the second segment information; and means for detecting drift based on the computed drift in values by combining the computed drift in segments to generate overall drift, and comparing the overall drift against a drift threshold.

BRIEF DESCRIPTION OF DRAWINGS

A general architecture that implements the various features of the disclosure will now be described with reference to the drawings. The drawings and the associated descriptions are provided to illustrate example implementations of the disclosure and not to limit the scope of the disclosure. Throughout the drawings, reference numbers are reused to indicate correspondence between referenced elements.

FIG. 15 illustrates an example parameter table of the drift database, in accordance with an example implementation.

FIG. 16 illustrates an example segment table of the drift database, in accordance with an example implementation.

DETAILED DESCRIPTION

Figure 1:
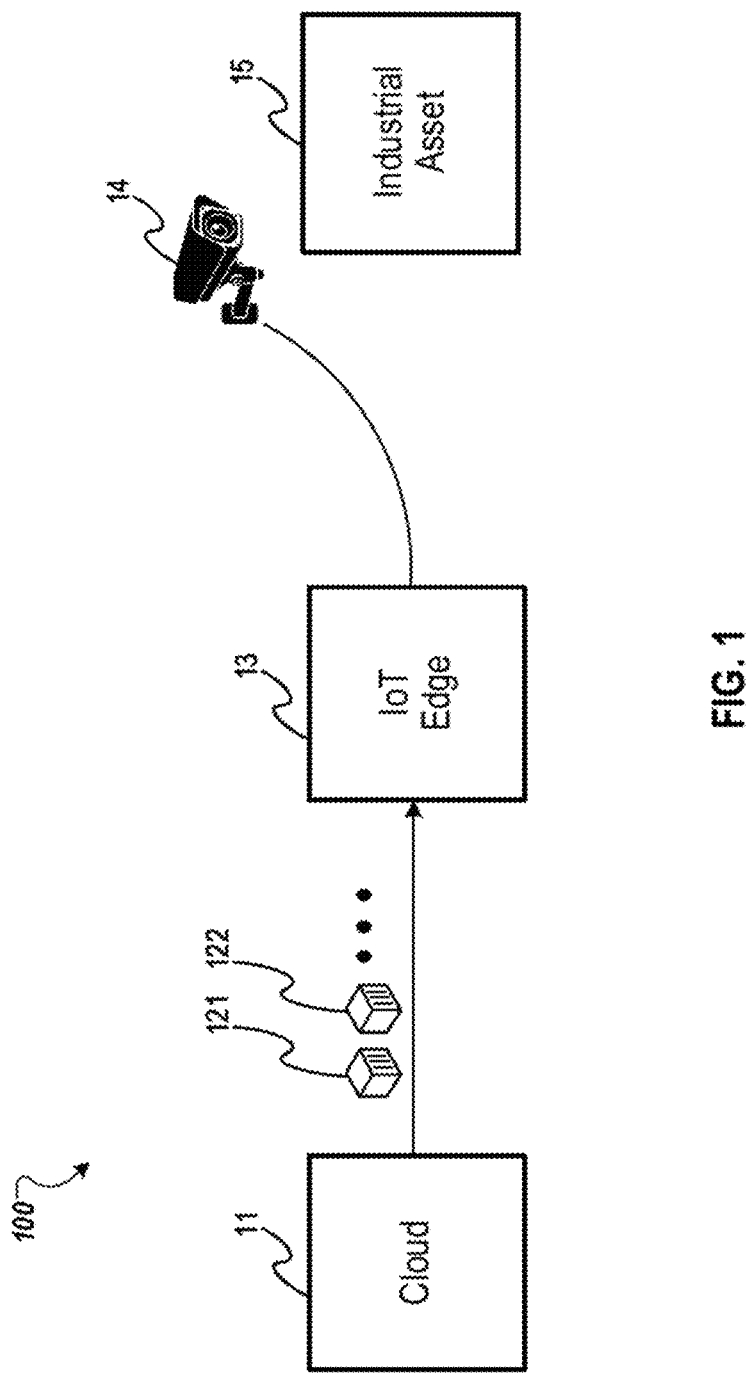
FIG. 1 illustrates an example detection system, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination, and the functionality of the example implementations can be implemented through any means according to the desired implementations.

Example implementations described herein can split images into segments in a dynamic fashion, compute drift separately in each segment, and then combine them to receive overall drift based on application information. On detection of drift, performing at least one of notification to a line manager and/or an ML engineer, recommendations on camera adjustment to maintenance personnel, or feedback as automatic control such as camera position adjustment and zoom out after drift detection.

Example implementations described herein are directed to a method by which an IoT edge gateway running inference on several ML models (corresponding to several applications) is capable of figuring out when drift has occurred in the data with respect to a specific application, without prior access to training data used in training the ML models. The example implementations described herein can allow internet of things (IoT) Edge gateway to detect occurrence of drift in image data with respect to an application with minimum latency and take necessary corrective action.

FIG. 1 illustrates an example detection system 100, in accordance with an example implementation. The detection system 100 may include components such as, but not limited to, cloud system 11, IoT edge 13, and camera 14. ML models such as ML models 121, 122, etc. are downloaded from the cloud system 11 into the IoT edge 13 which then applies inference of these models over video data obtained from camera 14 monitoring an industrial asset 15. In actual deployment, the cloud system 11 could be any public cloud system known in the art in accordance with the desired implementation, or a private cloud system provided by an application solution provider, or a combination of both. The IoT edge 13 can be physically located within a facility/factory and be connected to the cloud system 11, through wired or wireless transmission system, or a combination of both.

The IoT edge 13 downloads various pre-trained ML models 121, 122, etc. from the cloud server 11 and each model executes a certain application. The IoT edge 13 is connected to the camera 14, which monitors an industrial asset 15 and collects video data that will be used as input to the ML models 121 and 122 to run their inferences. For e.g., asset 15 could be a conveyer belt which is moving various parts that are being produced in the factory, and the camera data runs a ML model 121 to detect defects in those parts and runs ML model 122 to detect the cycle time of human inspection of the same parts.

Figure 2:
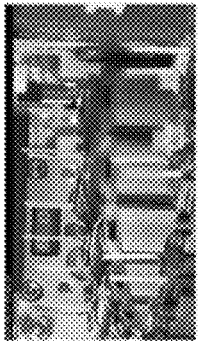
FIG. 2 illustrated data drift examples associated with image data.

FIG. 2 illustrated data drift examples associated with image data. Different types of data drift can happen when the data is image data. For e.g., the drift may be temporary (only affecting a few image frames) or permanent (affecting all image frames after a time instant). Permanent drifts are more serious in nature and worthier of attention as short term (or temporary) drifts tend to go away on their own. Examples of permanent drifts may include camera lens smearing, change of camera angle through accidental contact, etc.

Taking dust or oil smearing on camera lens as example, a part of the resulting image looks different from what it should have been. Technically, the image is now in drift from the traditional definition of drift (i.e., if a function of p is the distribution over normal images, then the value of p(X) where X is the image in question becomes low). But based on visual cognition, focus can be placed on the concept of drift that affects part of the image as opposed to drifts that affect the image as a whole. A solution that detects drift by partitioning an input image into various segments and computing drift over each segment will be described in more details below.

The concept of concept drift is of utmost interest, i.e., if the inference result of the IL model is wrong as a result of data drift. While a drift may affect only part of an image, however, the overall performance of ML model inference may not necessarily suffer. This is especially true if drift happened in a part of the image which was not considered by the ML model. This could happen if the pre-processing step of the ML model had cropped out the part of the image that was in drift. Assuming that the ML models 121, 122, etc. are being downloaded from the cloud system 11 to the IoT edge 13, with such properties of the ML models not known apriori, and thus cannot simply, during inference, look at an image which is partly in drift, and be able to determine if that drift will lead to concept drift.

Figure 3:
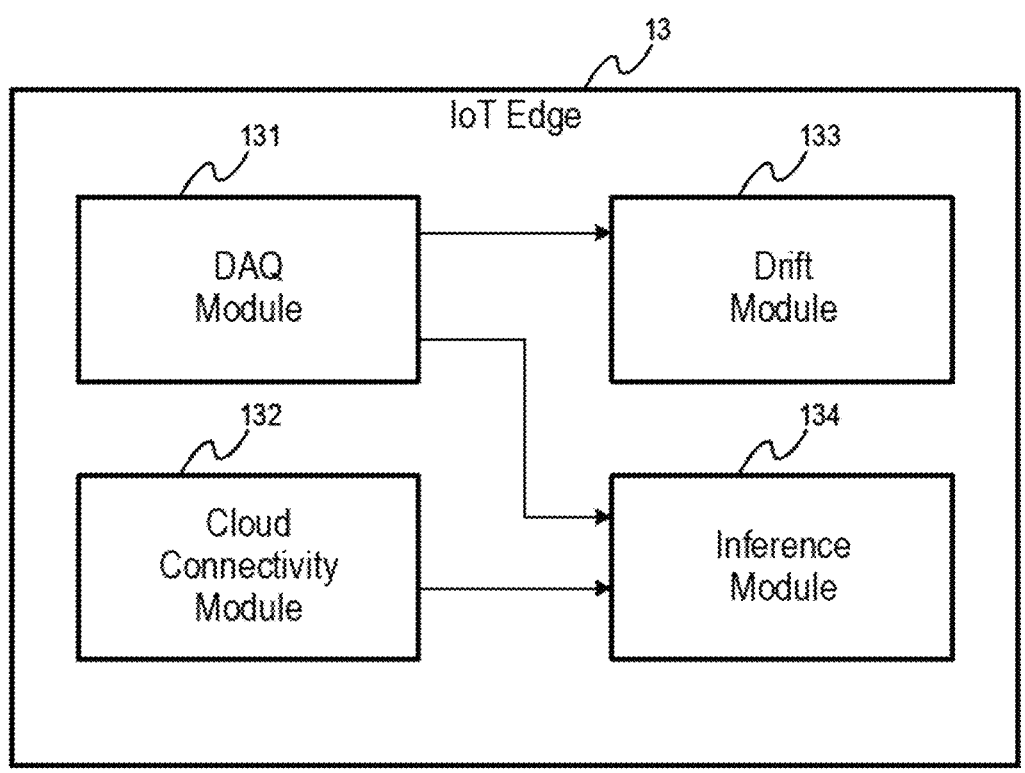
FIG. 3 illustrates an example IoT edge, in accordance with an example implementation.

FIG. 3 illustrates an example IoT edge 13, in accordance with an example implementation. The IoT edge 13 may include components such as, but not limited to, a data acquisition (DAQ) module 131, a cloud connectivity module 132, a drift module 133, and an inference module 134. The drift module 133 is comprised of software components, which can be packaged accordingly, for e.g., as a docker container. The DAQ module 131 obtains images from camera 14 for processing. The cloud connectivity module 132 downloads ML models 121, 122, etc. from the cloud system 11. The inference module 134 obtains the downloaded ML models 121, 122, etc. from the cloud connectivity module 132, and performs inference on camera data from the DAQ module 131. The drift module 133 will be described in details below.

Figure 4:
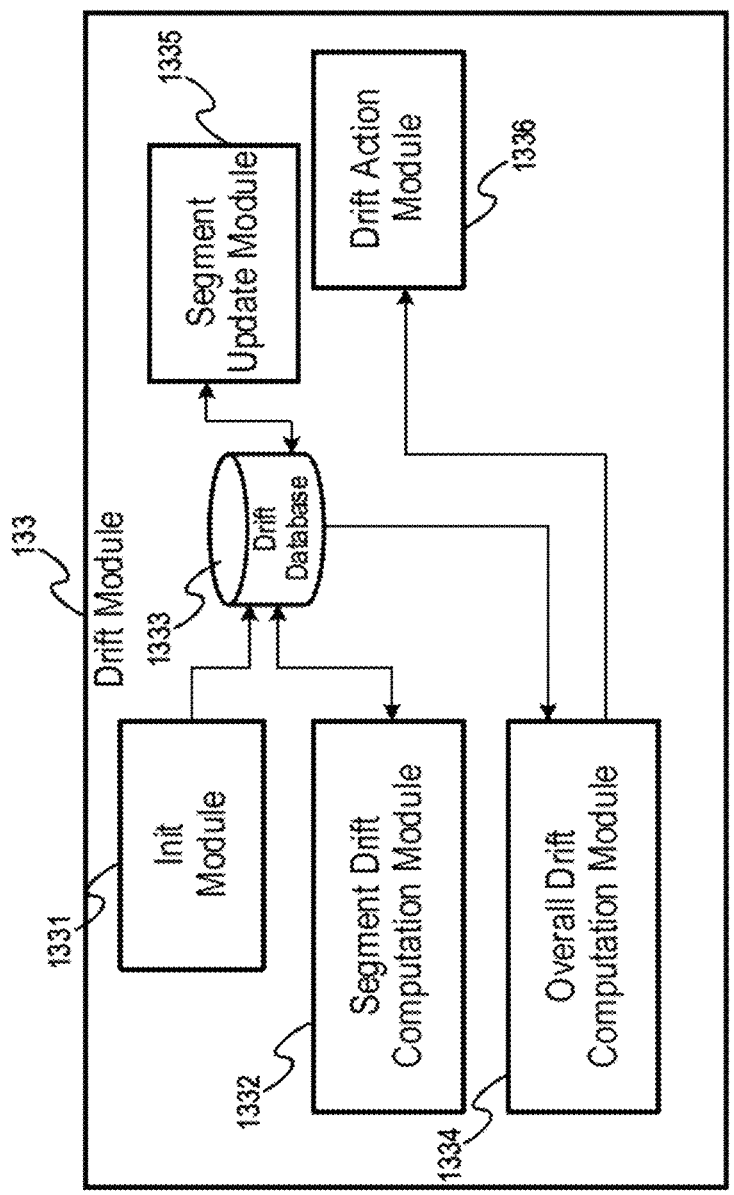
FIG. 4 illustrates an example drift module, in accordance with an example implementation.

FIG. 4 illustrates an example draft module 133, in accordance with an example implementation. The draft module 133 may include components such as, but not limited to, an init module 1331, a segment drift computation module 1332, a draft database 1333, an overall drift computation module 1334, a segment update module 1335, and a drift action module 1336. The init module 1331 initializes various parameters of the proposed solution and defines an initial set of partitions of the image. The generated results are then written to the drift database 1333. The segment drift computation module 1332 computes whether each segment, as currently defined in the drift database 1333, is experiencing drift at time t.

The overall drift computation module 1334 computes whether the overall image is experiencing drift at time t with respect to a given application where each application is tied to a specific ML model 121, 122, etc. The segment update module 1335 reads the number and shapes of the current image segments and the trend in how they are affected by drift (as currently defined in the drift database 1333), and updates both the number and shapes of these segments. The drift action module 1336 takes corrective action upon receiving message/flag from the overall drift computation module 1334 that drift has occurred. The three modules, segment drift computation module 1332, overall drift computation module 1334, and segment update module 1335, perform their operations in an asynchronous manner, with all three modules reading and/or writing to the drift database 1333.

Figure 5:
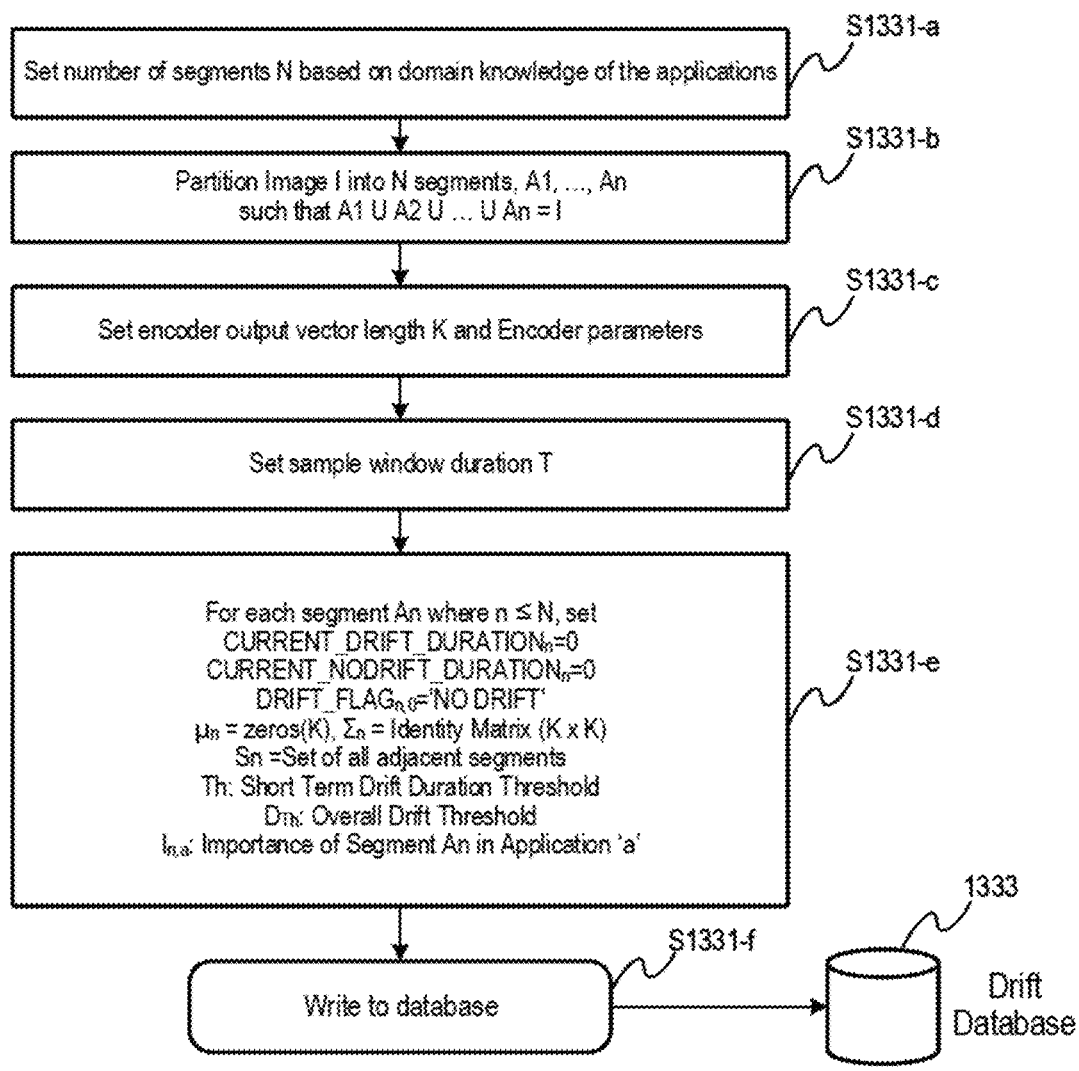
FIG. 5 illustrates an example process flow of the init module, in accordance with an example implementation.

FIG. 5 illustrates an example process flow of the init module 1331, in accordance with an example implementation. The process begins with step S1331-a, where number of segments N associated with an input image is set based on domain knowledge of the applications. This can be done based on apriori domain knowledge about the image and knowledge about the ML models 121, 122, etc. For example, taking the layout of the assembly line whose image is being taken by the camera into consideration, identifying parts of that layout that are relevant for the subsequent ML models, etc.

Figure 6:
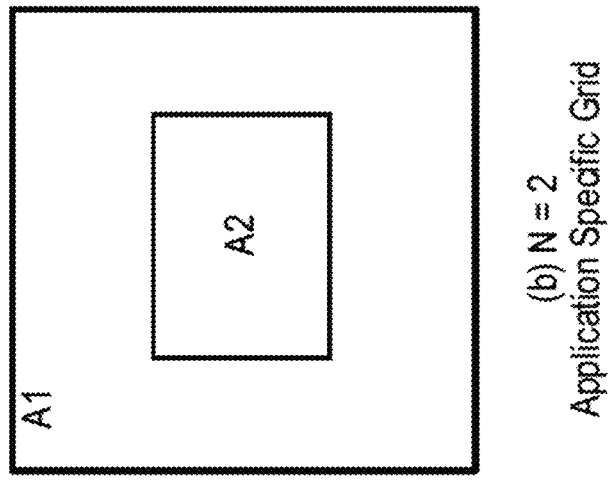
FIGS. 6A and 6B illustrate examples of partitioning images into segments, in accordance with an example implementation.

At step S1331-b, the input image is partitioned into N segments A1, . . . , An. The shapes of these segments are chosen based on apriori domain knowledge about the image and knowledge about the ML models 121, 122, etc. FIGS. 6A and 6B illustrate examples of partitioning images into segments, in accordance with an example implementation. As illustrated in FIG. 6A, the image is partitioned into nine segments in a uniform three-by-three grid pattern. In some example implementations, the three-by-three grid pattern is the default when there is no apriori domain information about the image and can be used to keep subsequent computation cost low given the segment number.

As illustrated in FIG. 6B, the image is partitioned into two segments with an inner segment A2 focusing on the middle portion of the image, and an outer segment A1 focusing on area outside of the inner segment A2. This corresponds to a situation where the camera is focused on an object of interest to the ML model (e.g., a camera observing a part being manufactured, etc.) and the object of interest appears in the middle portion of the image. The exact boundaries of the inner segment A2 depend on the size of the object, or else can be chosen based on additional statistical information. Since all segments are taken into consideration when computing overall image drift in the overall drift computation module 1334, steps 1331-a and 1331-b do have to be performed with absolute precision.

At step S1331-c, encoder parameters and an output vector of length K are set. The encoder takes the segments A1, . . . , An as input and produces a vector of length K as output. At step S1331-d, a sample window size of T is set. In the segment drift computation module 1332, T samples of output vectors of length K are considered and statistics are computed.

At step S1331-e, a number of parameters are set for each segment An, where n≤N. These parameters include CURRENT_DRIFT_DURATION$_n$, CURRENT_NODRIFT_DURATION$_n$, and DRIFT_FLAG$_{n,0}$. The counter CURRENT_DRIFT_DURATION$_n$ indicates the amount of time (in terms of the number of images) since drift was first detected in segment An. When drift is no longer detected in segment An, the counter is reset to 0. Similarly, CURRENT_NODRIFT_DURATION$_n$ indicates the amount of time (in terms of the number of images) when there is no drift in segment An. When drift is detected in segment An, this counter is reset to 0. In the beginning, both counters are initialized to 0. At all instances, one of these counters will be zero and the other will be non-zero, as a segment will either be in drift or not in drift. The flag, DRIFT_FLAG$_{n,t}$, has three states: "NO DRIFT", "SHORT TERM", and "LONG TERM", to indicate the status of the drift in segment An and time t. At time t=0, the flag is initialized to "NO DRIFT".

$\mu_n$ is initialized as a vector of size K with all zeros, and $\Sigma_n$ as an identity matrix of size (K×K). These represent the mean and covariance of the encoder output (a vector of size K) of image segment An, where the mean and covariance are computed and updated over batches of sample size T. Sn is a set of all adjacent segments to the segment An, where adjacent is defined as boundary sharing. Taking FIG. 6A as example: S1={A2, A4, A5}, S2={A1, A3, A4, A5, 6}, S3={A2, A5, A6}. As illustrated in FIG. 6B, S1={A2}, S2={A1}. Th and D$_{Th}$ are thresholds that will be described in more details below.

The last variable is I$_{n,a}$, which shows the importance of segment 'n' in application 'a' where application 'a' is executed by a ML model 121, 122, etc. Taking FIG. 6B as example, if it is known that the ML model for application 'a' focuses on the center part of the overall image, then $I_{2,a}$ should be set to a higher value than $I_{1,a}$. If these values are not known from apriori domain knowledge, then $I_{n,a}$ can be set the same value for all 'n' for a given 'a'. At step S1331-*f*, the variables are written to the drift database 1333.

Figure 7:
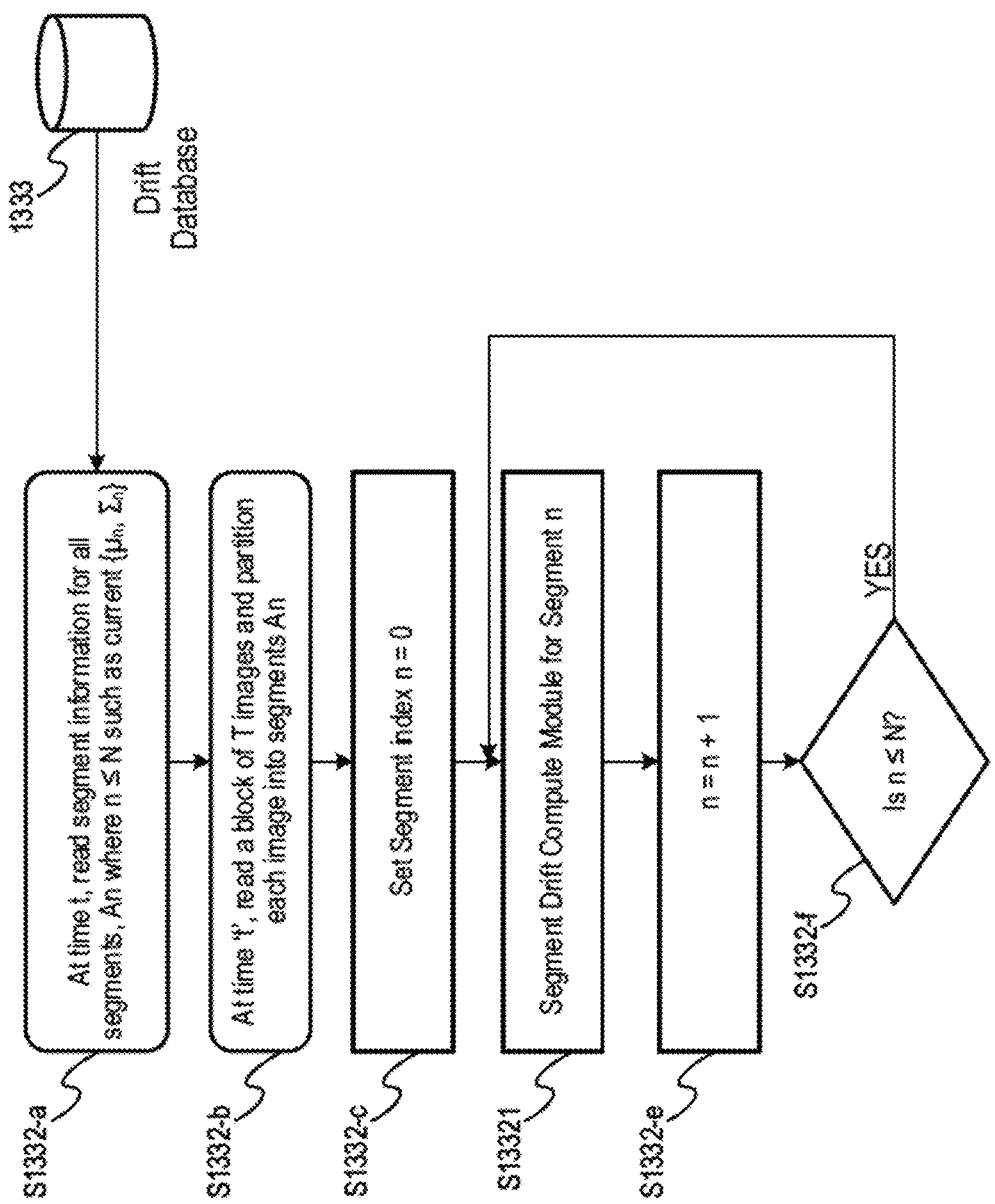
FIG. 7 illustrates an example process flow of the segment drift computation module, in accordance with an example implementation.

FIG. 7 illustrates an example process flow of the segment drift computation module 1332, in accordance with an example implementation. At step S1332-*a*, read segment information is read for all segments from the drift database 1333 at time t. Segment information may include current $\{\mu_n, \Sigma_n\}$ values for each segment An at current time and also information on the boundaries of each segment An.

At step S1332-*b*, a block of T images is read and each image is partitioned into segments An. The process then continues to step S1332-*c*, where segment index counter n is set to 0. Then execute the segment drift computation module 1332 is then executed at step S1332-*d*. At step S1332-*e*, n is incremented by 1. The process then continues to step S1332-*f*, where a determination is made as to whether all segments have been covered. If the answer is no, then the process returns to step S1332-*d* for further processing.

Figure 8:
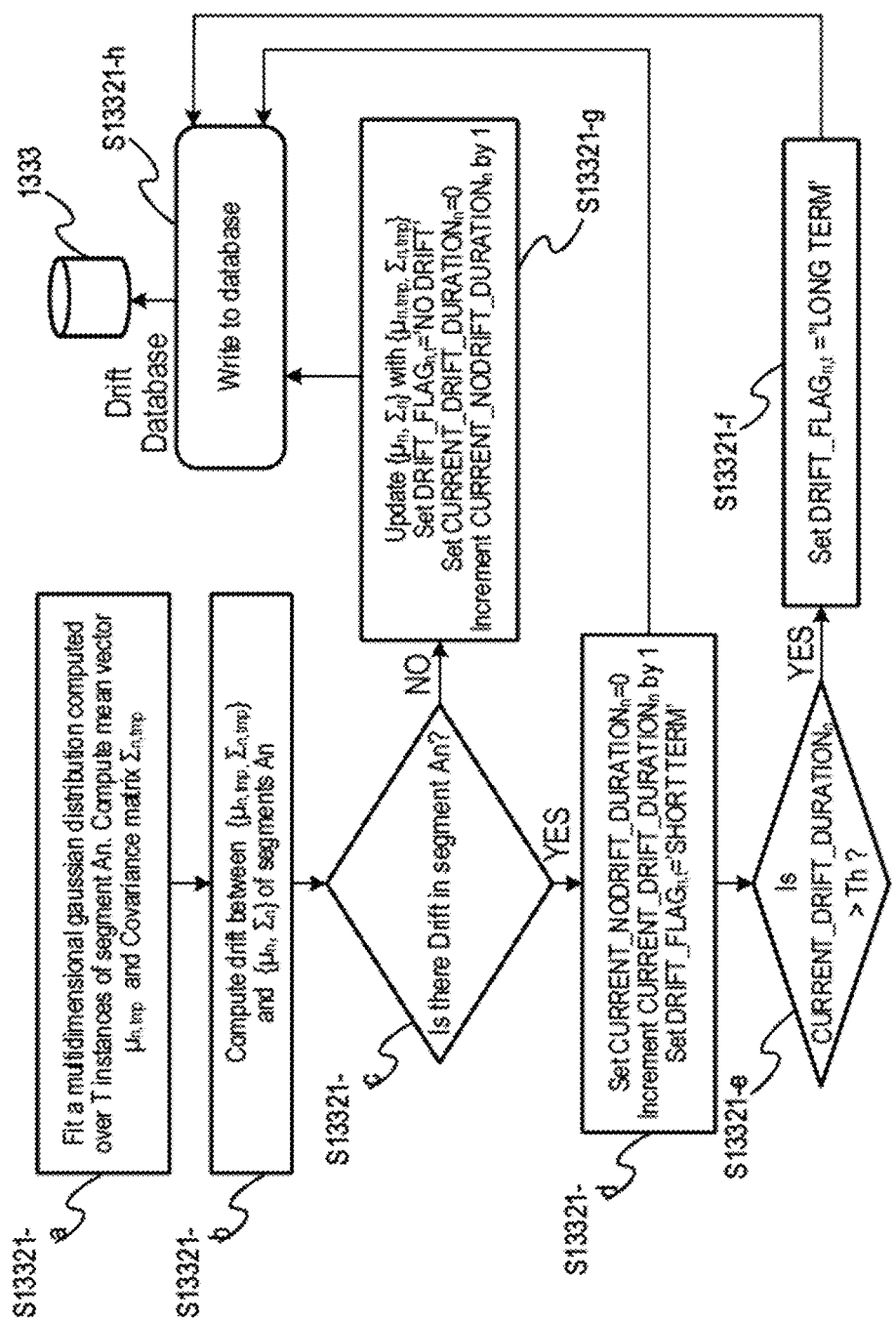
FIG. 8 illustrates an example process flow of step S1332-d of FIG. 7, in accordance with an example implementation.

FIG. 8 illustrates an example process flow of step S1332-*d* of FIG. 7, in accordance with an example implementation. The process begins at step S13321-*a*, where a segment $A_n$ is input and passed through an encoder to obtain a feature vector of length K, where T samples of these feature vectors are collected and a multidimensional gaussian distribution is fitted over the T samples. Thereafter, mean vector $\mu_{n,tmp}$ and covariance matrix $\Sigma_{n,tmp}$ are computed.

At step S13321-*b*, drift between $\{\mu_{n,tmp}, \Sigma_{n,tmp}\}$ and $\{\mu_n, \Sigma_n\}$ is computed using standard statistical distance measures between vectors and matrices such as norms. In some example implementations the drift between $\{\mu_{n,tmp}, \Sigma_{n,tmp}\}$ and $\{\mu_n, \Sigma_n\}$ is computed using the following equation:

$$dr = \text{drift\_function}(\mu_{n,tmp}, \Sigma_{n,tmp}, \mu_n, \Sigma_n)$$

At step S13321-*c*, a determination is made as to whether drift is detected in segment An. This is performed by comparing the distance values/drift obtained in step S13321-*b* with a threshold, Th_Drift. Specifically, if the distance values/drift is greater than Th_Drift, then drift is detected. On the other hand, if the distance values/drift is less than Th_Drift, then drift is not detected.

If drift is not detected at S13321-*c*, then the process continues to step S13321-*g*, where DRIFT_FLAG$_{n,t}$ is set to "NO DRIFT", CURRENT_DRIFT_DURATION$_n$ is set to 0, and CURRENT_NODRIFT_DURATION$_n$ is incremented by 1. At the same time, the current values of $\{\mu_n, \Sigma_n\}$ are updated with $\{\mu_{n,tmp}, \Sigma_{n,tmp}\}$ using existing statistical methods for parameter update.

If drift is detected at S13321-*c*, then the process continues to step S13321-*d*, where CURRENT_NODRIFT_DURATION$_n$ is set to 0, CURRENT_DRIFT_DURATION$_n$ is incremented by 1, and DRIFT_FLAG$_{n,t}$ is set to "SHORT TERM".

At step S13321-*e*, a determination is made as to whether CURRENT_DRIFT_DURATION$_n$ is greater than the threshold Th obtained in step 1331-*e* of FIG. 5. The verification step is essential to see if drift is being consistently observed in a segment over an extended duration. If the answer is yes, then DRIFT_FLAG$_{n,t}$ is set to "LONG TERM" at step S13321-*f*. The output of each of steps S13321-*g*, S13321-*d*, and S13321-*f*, whenever there is change in flag and/or the counters, is written to the drift database 1333 at step S13321-*h*.

Figure 9:
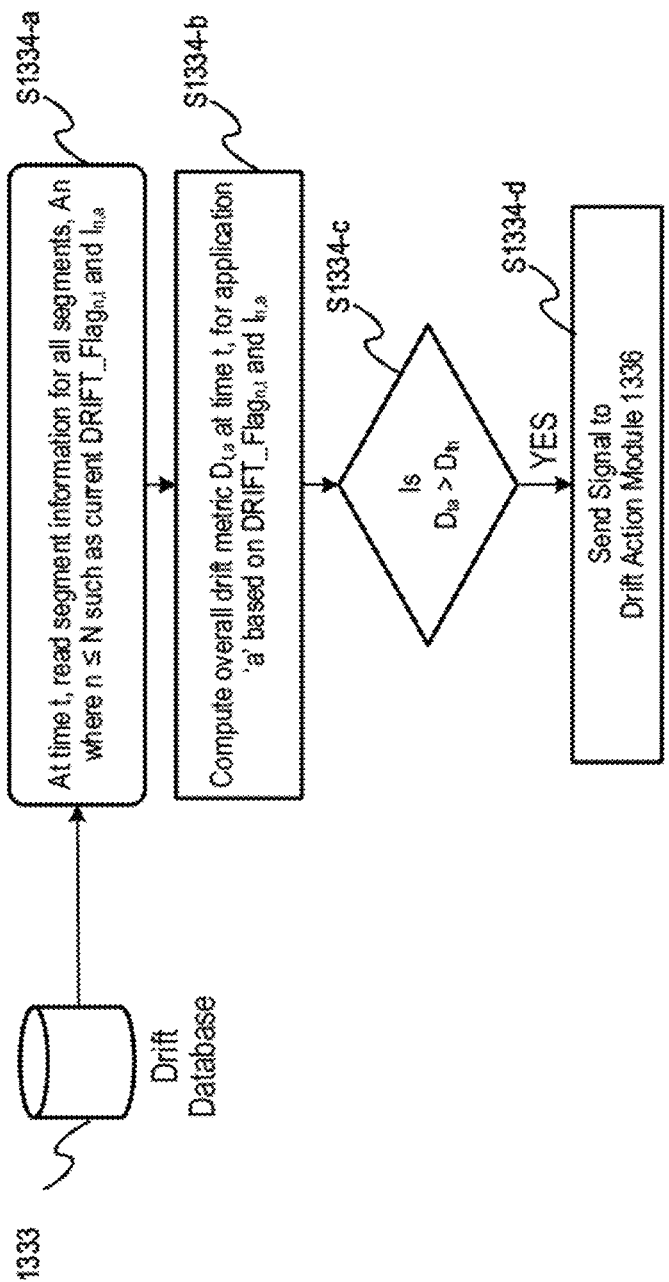
FIG. 9 illustrates an example process flow of the overall drift computation module, in accordance with an example implementation.

FIG. 9 illustrates an example process flow of the overall drift computation module 1334, in accordance with an example implementation. The process begins at step S1334-*a*, segment information for all segments $A_n$ where n≤N is read/retrieved from the drift database 1333. Segment information may include, but not limited to, current DRIFT_FLAG$_{n,t}$ and $I_{n,a}$.

At step S1334-*b*, overall drift metric $D_{t,a}$ at time t is calculated for application "a" based on DRIFT_FLAG$_{n,t}$ and $I_{n,a}$ by considering some functions of the two. In some example implementations, a linear combination of the DRIFT_FLAG$_{n,t}$ values, weighed by $I_{n,a}$ is considered. The effect of the application ML model is thus taken into consideration.

At step S1334-*c*, a determination is made as to whether $D_{t,a}$ is above a threshold $D_{Th}$, which denotes the presence of overall image drift. If the answer is yes, then the process proceeds to step S1334-*d*, where a signal is sent to the drift action module 1336.

Figure 10:
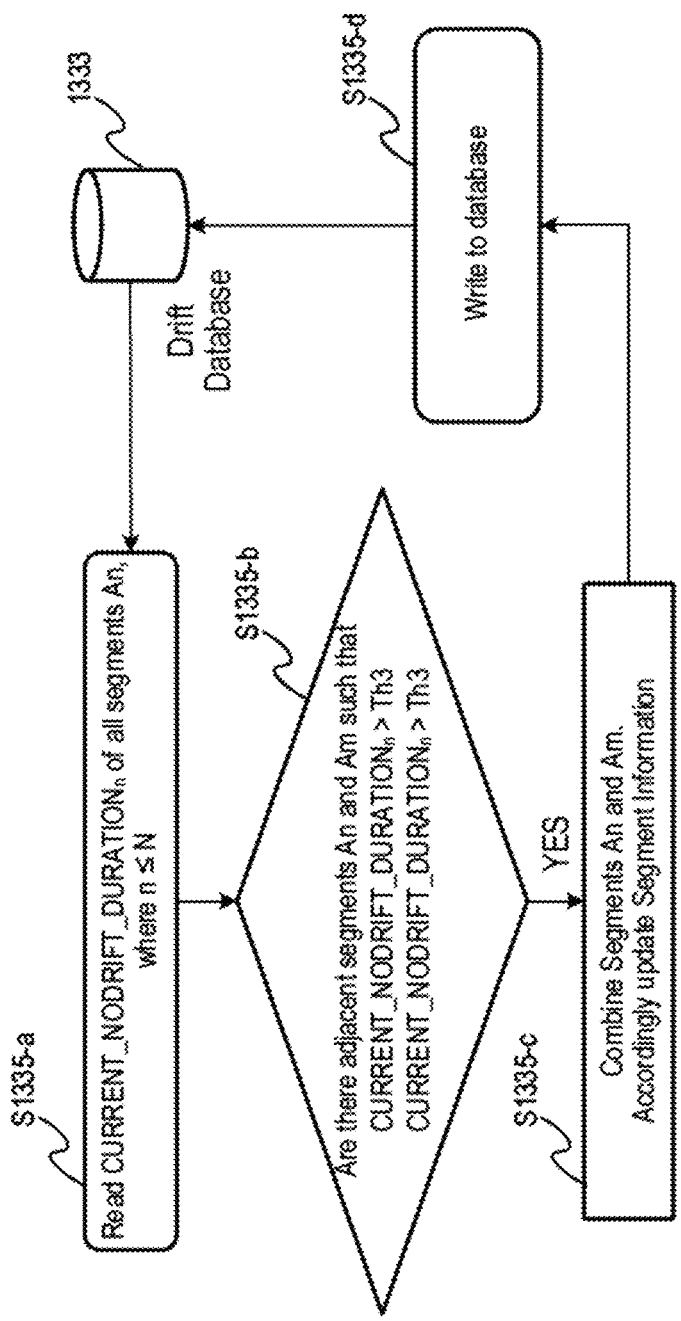
FIG. 10 illustrates an example process flow of the segment update module for performing segment combining, in accordance with an example implementation.

FIG. 10 illustrates an example process flow of the segment update module 1335 for performing segment combining, in accordance with an example implementation. The process beings at step S1335-*a*, where CURRENT_NODRIFT_DURATION$_n$ of all segments An where n≤N are read. At step S1335-*b*, a determination is made as to whether two adjacent segments m and n have not experienced drift for some time. In other words, CURRENT_NODRIFT_DURATION$_n$ and CURRENT_NODRIFT_DURATION$_m$ are both above a threshold Th3.

If such segments exist, then the process continues to step S1335-*c*, where the two segments are combined into a single segment and the segment information in the drift database 1333 is updated accordingly to reflect the change at step S1335-*d*. Since the adjacent segments are not experiencing drift, the drift detection algorithm can simply combine the two to simplify the process.

Figure 11:
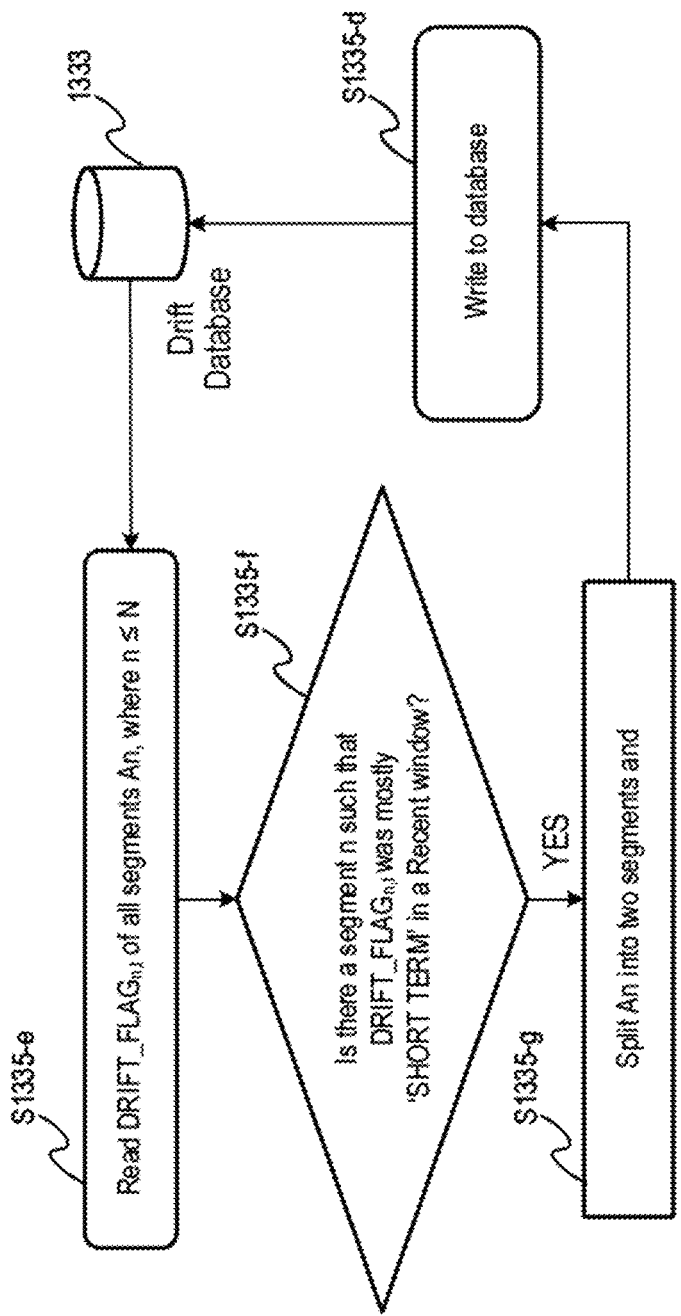
FIG. 11 illustrates an example process flow of the segment update module for performing segment splitting, in accordance with an example implementation.

FIG. 11 illustrates an example process flow of the segment update module 1335 for performing segment splitting, in accordance with an example implementation. The process beings at step S1335-*e*, where DRIFT_FLAG$_{n,t}$ of all segments An, where n≤N are read. At step S1335-*a* determination is made as to whether there is a segment An having DRIFT_FLAG$_{n,t}$ that was mostly "SHORT TERM" in a recent window of a predetermined size. For example, if size=100, then check if |S|>50 where S={t, such that DRIFT_FLAG$_{n,t}$="SHORT TERM" for t_current−100<t<t_current}.

If such a segment exists, then the process continues to step S1335-*g*, where the segment is split into two smaller segments, and the segment information in the drift database 1333 is updated accordingly to reflect the changes at step S1335-*d*.

Figure 12:
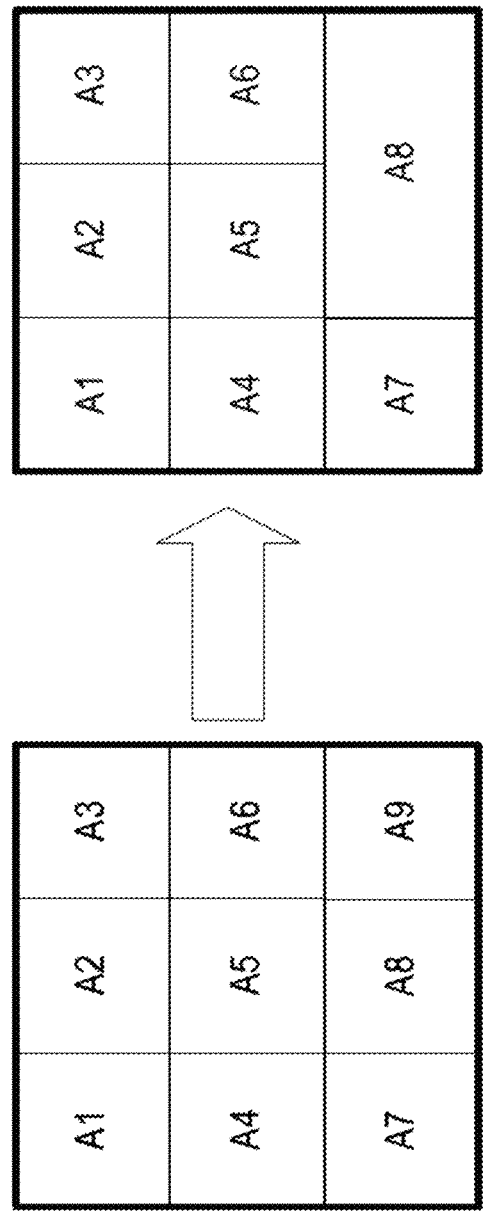
FIG. 12 illustrates an example of segment combination, in accordance with an example implementation.

FIG. 12 illustrates an example of segment combination, in accordance with an example implementation. As illustrated in FIG. 12, the image started with nine segments of A1-A9. On completion of segment combination, the segments A8 and A9 are combined into a new, larger segment A8 that replaces the two original segments. The changed segment information is updated and reflected in the drift database 1333.

Figure 13:
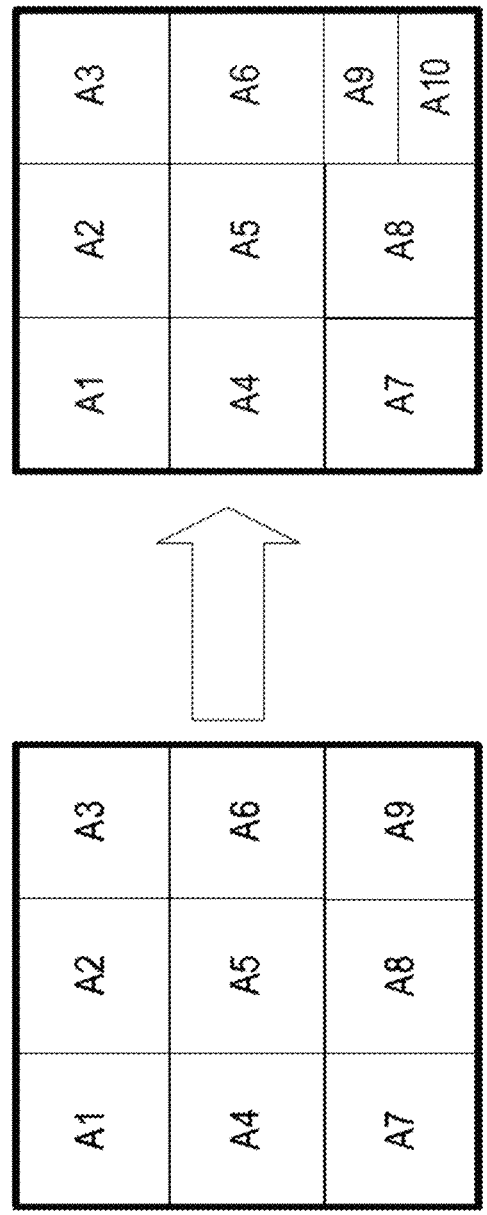
FIG. 13 illustrates an example of segment splitting, in accordance with an example implementation.

FIG. 13 illustrates an example of segment splitting, in accordance with an example implementation. As illustrated in FIG. 13, the image started with nine segments of A1-A9. On completion of segment splitting, the segment A9 is split into two smaller segments of A9 and A10 that replaces the original segment A9. The changed segment information is updated and reflected in the drift database 1333.

Figure 14:
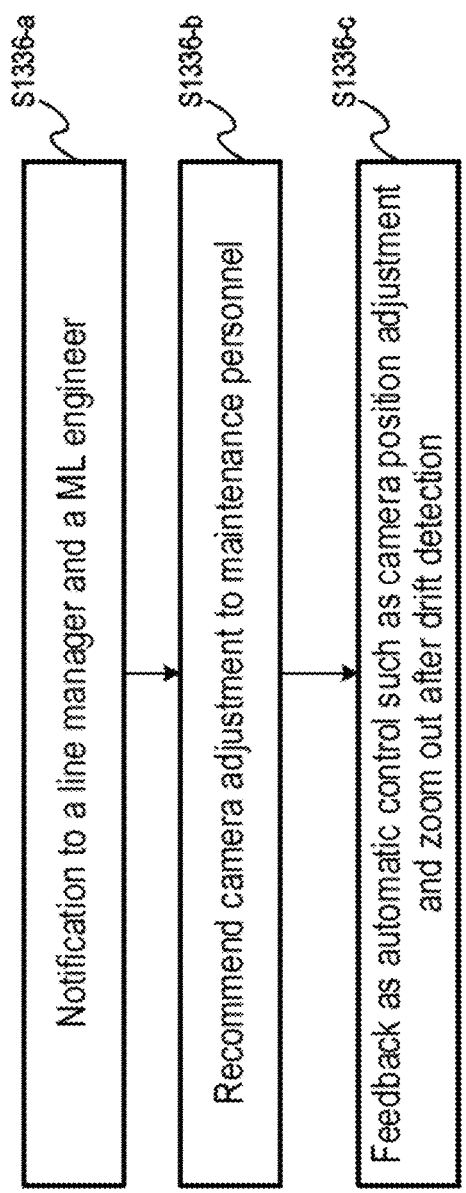
FIG. 14 illustrates an example process flow of the drift action module, in accordance with an example implementation.

FIG. 14 illustrates an example process flow of the drift action module 1336, in accordance with an example implementation. The process flow is initiated when the drift action module 1336 receives the signal from the overall drift computation module 1334 as shown in FIG. 9. At step S1336-a, a notification is sent to a line manager and/or a ML engineer. At step S1336-b, recommendations are made maintenance personnel to make camera adjustment. At step S1336-c, feedback is provided as automatic control, which may include camera position adjustment, etc. In alternate example implementations, the steps are taken in a different sequence. In some example implementations, depending on the amount of drift detected and the information conveyed in step S1334-d by the overall drift computation module 1334, one or more of these steps selected and performed.

The three modules, segment drift computation module 1332, overall drift computation module 1334, and segment update module 1335, perform their operations in an asynchronous manner. Each of the modules read and/or write to the drift database 1333. The drift database 1333 comprises two tables—a parameter table and a segment table.

FIG. 15 illustrates an example parameter table of the drift database 1333, in accordance with an example implementation. As illustrated in FIG. 15, the parameter table may include fields such as, but not limited to, parameter identifier, value, description, etc.

FIG. 16 illustrates an example segment table of the drift database 1333, in accordance with an example implementation. As illustrated in FIG. 16, the segment table may include fields such as, but not limited to, segment identifier, trajectory points, $CURRENT\_DRIFT\_DURATION_n$, $CURRENT\_NODRIFT\_DURATION_n$, adjacent segments $S_n$, $\mu_n$, $\Sigma_n$, segment importance parameter, $DRIFT\_FLAG_{n,t}$ vector for (t−100, t), etc.

The foregoing example implementation may have various benefits and advantages. For example, improving performance in relation to drift detection, such as detection speed, and detection in association with unstructured image data. Additionally, internet of things (IoT) edge gateway can be utilized to detect occurrence of drift in image data with respect to an application with minimum latency and take necessary corrective action.

Figure 17:
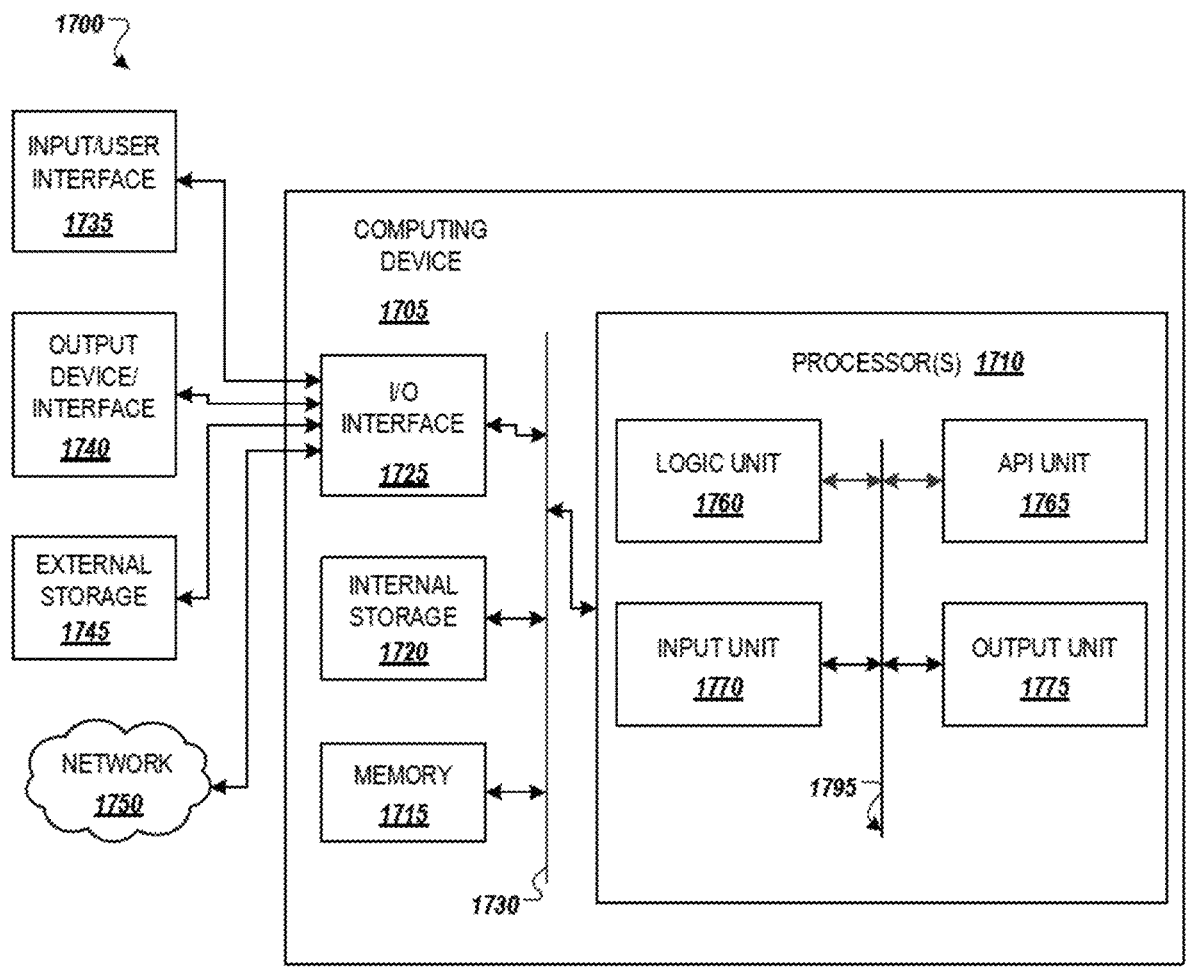
FIG. 17 illustrates an example computing environment with an example computing device suitable for use in some example implementations.

FIG. 17 illustrates an example computing environment with an example computing device suitable for use in some example implementations. Computing device 1705 in computing environment 1700 can include one or more processing units, cores, or processor(s) 1710, memory 1715 (e.g., RAM, ROM, and/or the like), internal storage 1720 (e.g., magnetic, optical, solid-state storage, and/or organic), and/or I/O interface 1725, any of which can be coupled on a communication mechanism or bus 1730 for communicating information or embedded in the computing device 1705. I/O interface 1725 is also configured to receive images from cameras or provide images to projectors or displays, depending on the desired implementation.

Computing device 1705 can be communicatively coupled to input/user interface 1735 and output device/interface 1740. Either one or both of the input/user interface 1735 and output device/interface 1740 can be a wired or wireless interface and can be detachable. Input/user interface 1735 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/interface 1740 may include a display, television, monitor, printer, speaker, braille, or the like. In some example implementations, input/user interface 1735 and output device/interface 1740 can be embedded with or physically coupled to the computing device 1705. In other example implementations, other computing devices may function as or provide the functions of input/user interface 1735 and output device/interface 1740 for a computing device 1705.

Examples of computing device 1705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 1705 can be communicatively coupled (e.g., via/O interface 1725) to external storage 1745 and network 1750 for communicating with any number of networked components, devices, and systems, including one or more computing devices of the same or different configuration. Computing device 1705 or any connected computing device can be functioning as, providing services of, or referred to as, a server, client, thin server, general machine, special-purpose machine, or another label.

I/O interface 1725 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1700. Network 1750 can be any network or combination of networks (e.g., the Internet, local area network, wide area network, a telephonic network, a cellular network, satellite network, and the like).

Computing device 1705 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computing device 1705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1710 can execute under any operating system (OS) (not shown), in a native or virtual environment. One or more applications can be deployed that include logic unit 1760, application programming interface (API) unit 1765, input unit 1770, output unit 1775, and inter-unit communication mechanism 1795 for the different units to communicate with each other, with the OS, and with other applications (not shown). The described units and elements can be varied in design, function, configuration, or implementation and are not limited to the descriptions provided. Processor(s) 1710 can be in the form of hardware processors such as central processing units (CPUs) or in a combination of hardware and software units.

In some example implementations, when information or an execution instruction is received by API unit 1765, it may be communicated to one or more other units (e.g., logic unit 1760, input unit 1770, output unit 1775). In some instances, logic unit 1760 may be configured to control the information flow among the units and direct the services provided by API unit 1765, the input unit 1770, and the output unit 1775 in some example implementations described above. For example, the flow of one or more processes or implementations may be controlled by logic unit 1760 alone or in conjunction with API unit 1765. The input unit 1770 may be configured to obtain input for the calculations described in the example implementations, and the output unit 1775 may be configured to provide an output based on the calculations described in example implementations.

Processor(s) 1710 can be configured to retrieve first segment information of a plurality of segments from a drift database as illustrated in FIG. 8. The processor(s) 1710 may also be configured to receive a number of images from a sensor as illustrated in FIG. 8. The processor(s) 1710 may also be configured to partition each of the received images as illustrated in FIG. 8. The processor(s) 1710 may also be configured to into segments of a predetermined number as illustrated in FIG. 8. The processor(s) 1710 may also be configured to generate second segment information as illustrated in FIG. 8. The processor(s) 1710 may also be configured to compute drift in values between the first segment information and the second segment information as illustrated in FIG. 8. The processor(s) 1710 may also be configured to detect drift based on the computed drift in values by combining the computed drift in segments to generate overall drift, and comparing the overall drift against a drift threshold as illustrated in FIG. 8.

The processor(s) 1710 may also be configured to perform segment combination of segments of the plurality of segments, wherein the performing segment combination of segments of the plurality of segments comprises: reading the second set of counters from the drift database; determining counters of the second set of counters associated with each segment and an adjacent segment of the plurality of segments exceed a counter threshold; and for counters associated with a segment and an adjacent segment exceeding the counter threshold, combining the segment and the adjacent segment into a combined segment as illustrated in FIG. 10.

The processor(s) 1710 may also be configured to perform segment split of segments of the plurality of segments, wherein the performing segment split of segments of the plurality of segments comprises: reading the set of drift flags from the drift database; determining if any drift flag of the set of drift flags is designated as short term over a time threshold; and for drift flag of the set of drift flags having short term designation over the time threshold, splitting segment associated with drift flag into two separate segments as illustrated in FIG. 11.

The processor(s) 1710 may also be configured to perform, on detection of drift, at least one of notification provision to operator of the detected drift, recommendation provision on sensor adjustment, or feedback provision in performing automatic control as illustrated in FIG. 14.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible mediums such as, but not limited to, optical disks, magnetic disks, read-only memories, random access memories, solid-state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored in the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for computing and detecting image data drift, the method comprising:
retrieving first segment information of a plurality of segments from a drift database;
receiving a number of images from a sensor;
partitioning each of the received images into segments of a predetermined number;
generating second segment information;
computing drift in values between the first segment information and the second segment information; and
detecting drift based on the computed drift in values by combining the computed drift in segments to generate overall drift, and comparing the overall drift against a drift threshold,
wherein the first segment information comprises a first set of counters, and the first set of counters is derived by:
setting number of segments and shapes of segments based on domain knowledge of applications;
partitioning an image into the plurality of segments, wherein number of the plurality of segments is the number of segments; and
initializing the first set of counters to zero, wherein number of counters in the first set of counters corresponds to the number of segments, and each counter of the first set of counters monitors number of times drift is detected in respective segment of the plurality of segments.

2. The method of claim 1, wherein the first segment information comprises a first mean and a first covariance matrix associate with the plurality of segments, and the second segment information comprises a second mean and a second covariance matrix.

3. The method of claim 1, wherein the generating the second segment information comprises:
fitting, for each number less than or equal to the predetermined number, a multidimensional distribution computed over a number of instances of segment to generate the second segment information, wherein the number of instances of segment corresponds to number of the number of images.

4. The method of claim 1, wherein the predetermined number is same as number of segments of the plurality of segments from the drift database.

5. The method of claim 1, wherein the first segment information is derived by:
setting encoder parameters of an encoder, wherein the encoder parameters comprise a length K;
setting a sample window duration;
initializing a second set of counters to zero, wherein number of counters in the second set of counters corresponds to the number of segments, and each counter of the second set of counters monitors number of times drift is no longer detected in respective segment of the plurality of segments;
initializing a set of drift flags to indicate no drift, wherein number of drift flags in the set of drift flags corresponds to the number of segments, and each drift flag is associated with a corresponding segment;
generating a segment vector of size K as output of the encoder and initializing the segment vector, wherein the segment vector represents mean value associated with each of the plurality of segments, and the plurality of segments is provided as input to the encoder;
generating an identity matrix of size K by K as output of the encoder and initializing the identity matrix, wherein the identity matrix represents covariances of output from the encoder in association with the plurality of segments; and
storing the first set of counters, the second set of counters, the set of drift flags, the segment vector, and the identity matrix as the first segment information in the drift database.

6. The method of claim 5, wherein the computing drift in values between the first segment information and the second segment information comprises:
generating a second segment vector of size K associated with the second segment information;
generating a second identity matrix of size K by K associated with the second segment information; and
computing drift between the segment vector and the identity matrix against the second segment vector and the second identity matrix.

7. The method of claim 6,
wherein, for detection of drift in a segment between the segment vector and the identity matrix against the second segment vector and the second identity matrix:
updating entry associated with the segment in the segment vector with entry associated with the segment in the second segment vector;
updating entry associated with the segment in the identity matrix with entry associated with the segment in the second identity matrix;
setting counter associated with the segment in the first set of counters to zero;
incrementing counter associated with the segment in the second set of counters by one; and
setting drift flag of the segment as having no drift, and
wherein, for detection of no drift in a segment between the segment vector and the identity matrix against the second segment vector and the second identity matrix:
setting counter associated with the segment in the second set of counters to zero;
incrementing counter associated with the segment in the first set of counters by one;
setting drift flag of the segment as short term; and
for the counter associated with the segment in the first set of counters exceeding a duration threshold, setting the drift flag of the segment as long term.

8. The method of claim 7, further comprising:
performing segment combination of segments of the plurality of segments,
wherein the performing segment combination of segments of the plurality of segments comprises:
reading the second set of counters from the drift database;
determining counters of the second set of counters associated with each segment and an adjacent segment of the plurality of segments exceed a counter threshold; and
for counters associated with a segment and an adjacent segment exceeding the counter threshold, combining the segment and the adjacent segment into a combined segment.

9. The method of claim 7, further comprising:
performing segment split of segments of the plurality of segments,
wherein the performing segment split of segments of the plurality of segments comprises:
reading the set of drift flags front the drift database;
determining if any drift flag of the set of drift flags is designated as short term over a time threshold; and
for drift flag of the set of drift flags having short term designation over the time threshold, splitting segment associated with drift flag into two separate segments.

10. The method of claim 1, further comprising:
performing, on detection of drift, at least one of notification provision to operator of the detected drift, recommendation provision on sensor adjustment, or feedback provision in performing automatic control.

11. A non-transitory computer readable medium, storing instructions for computing and detecting image data drift, the instructions comprising:
retrieving first segment information of a plurality of segments from a drift database;
receiving a number of images from a sensor;
partitioning each of the received images into segments of a predetermined number;
generating second segment information;
computing drift in values between the first segment information and the second segment information; and
detecting drift based on the computed drift in values by combining the computed drift in segments to generate overall drift, and comparing the overall drift against a drift threshold,
wherein the first segment information comprises a first set of counters, and the first set of counters is derived by:
setting number of segments and shapes of segments based on domain knowledge of applications;
partitioning an image into the plurality of segments, wherein number of the plurality of segments is the number of segments; and
initializing the first set of counters to zero, wherein number of counters in the first set of counters corresponds to the number of segments, and each counter of the first set of counters monitors number of times drift is detected in respective segment of the plurality of segments.

12. The non-transitory computer readable medium of claim 11, wherein the first segment information comprises a first mean and a first covariance matrix associate with the plurality of segments, and the second segment information comprises a second mean and a second covariance matrix.

13. The non-transitory computer readable medium of claim 11, wherein the generating the second segment information comprises:
fitting, for each number less than or equal to the predetermined number, a multidimensional distribution computed over a number of instances of segment to generate the second segment information, wherein the number of instances of segment corresponds to number of the number of images.

14. The non-transitory computer readable medium of claim 11, wherein the predetermined number is same as number of segments of the plurality of segments from the drift database.

15. The non-transitory computer readable medium of claim 11, wherein the first segment information is derived by:
setting encoder parameters of an encoder, wherein the encoder parameters comprise a length K;
setting a sample window duration;
initializing a second set of counters to zero, wherein number of counters in the second set of counters corresponds to the number of segments, and each counter of the second set of counters monitors number of times drift is no longer detected in respective segment of the plurality of segments;
initializing a set of drift flags to indicate no drift, wherein number of drift flags in the set of drift flags corresponds to the number of segments, and each drift flag is associated with a corresponding segment;
generating a segment vector of size K as output of the encoder and initializing the segment vector, wherein the segment vector represents mean value associated with each of the plurality of segments, and the plurality of segments is provided as input to the encoder;
generating an identity matrix of size K by K as output of the encoder and initializing the identity matrix, wherein the identity matrix represents covariances of output from the encoder in association with the plurality of segments; and
storing the first set of counters, the second set of counters, the set of drift flags, the segment vector, and the identity matrix as the first segment information in the drift database.

16. The non-transitory computer readable medium of claim 15, wherein the computing drift in values between the first segment information and the second segment information comprises:
generating a second segment vector of size K associated with the second segment information;
generating a second identity matrix of size K by K associated with the second segment information; and
computing drift between the segment vector and the identity matrix against the second segment vector and the second identity matrix.

17. The non-transitory computer readable medium of claim 16,
wherein, for detection of drift in a segment between the segment vector and the identity matrix against the second segment vector and the second identity matrix:
updating entry associated with the segment in the segment vector with entry associated with the segment in the second segment vector;
updating entry associated with the segment in the identity matrix with entry associated with the segment in the second identity matrix;
setting counter associated with the segment in the first set of counters to zero;
incrementing counter associated with the segment in the second set of counters by one; and
setting drift flag of the segment as having no drift, and
wherein, for detection of no drift in a segment between the segment vector and the identity matrix against the second segment vector and the second identity matrix:
setting counter associated with the segment in the second set of counters to zero;
incrementing counter associated with the segment in the first set of counters by one;
setting drift flag of the segment as short term; and
for the counter associated with the segment in the first set of counters exceeding a duration threshold, setting the drift flag of the segment as long term.

18. The non-transitory computer readable medium of claim 17, further comprising:

performing segment combination of segments of the plurality of segments,
wherein the performing segment combination of segments of the plurality of segments comprises:
reading the second set of counters from the drift database;
determining counters of the second set of counters associated with each segment and an adjacent segment of the plurality of segments exceed a counter threshold; and
for counters associated with a segment and an adjacent segment exceeding the counter threshold, combining the segment and the adjacent segment into a combined segment.

19. The non-transitory computer readable medium of claim 17, further comprising:
performing segment split of segments of the plurality of segments,
wherein the performing segment split of segments of the plurality of segments comprises:
reading the set of drift flags from the drift database;
determining if any drift flag of the set of drift flags is designated as short term over a time threshold; and
for drift flag of the set of drift flags having short term designation over the time threshold, splitting segment associated with drift flag into two separate segments.

20. The non-transitory computer readable medium of claim 11, further comprising:
Performing, on detection of drift, at least one of notification provision to operator of the detected drift, recommendation provision on sensor adjustment, or feedback provision in performing automatic control.

* * * * *